United States Patent
Huang et al.

(10) Patent No.: US 8,005,093 B2
(45) Date of Patent: Aug. 23, 2011

(54) PROVIDING CONNECTION BETWEEN NETWORKS USING DIFFERENT PROTOCOLS

(75) Inventors: Hui Huang, Beijing (CN); Hao Wang, Beijing (CN); Kai Zhao, Beijing (CN)

(73) Assignee: Nokia Corporation, Espoo (FI)

( * ) Notice: Subject to any disclaimer, the term of this patent is extended or adjusted under 35 U.S.C. 154(b) by 851 days.

(21) Appl. No.: 11/089,006

(22) Filed: Mar. 24, 2005

(65) Prior Publication Data

US 2006/0062248 A1 Mar. 23, 2006

(30) Foreign Application Priority Data

Sep. 23, 2004 (EP) .................................... 04022632

(51) Int. Cl.
*H04L 12/28* (2006.01)
(52) U.S. Cl. .................... 370/395.5; 370/338; 370/392; 370/341; 370/349
(58) Field of Classification Search .................. 370/392, 370/400, 401, 395.5, 338, 310, 341, 390
See application file for complete search history.

(56) References Cited

U.S. PATENT DOCUMENTS

| | | | | |
|---|---|---|---|---|
| 6,038,233 A * | 3/2000 | Hamamoto et al. | ........... | 370/401 |
| 6,172,986 B1 * | 1/2001 | Watanuki et al. | ............. | 370/466 |
| 6,567,664 B1 * | 5/2003 | Bergenwall et al. | ........ | 455/435.1 |
| 6,636,498 B1 * | 10/2003 | Leung | .............................. | 370/338 |
| 6,865,184 B2 * | 3/2005 | Thubert et al. | ................ | 370/401 |
| 7,031,328 B2 * | 4/2006 | Thubert et al. | ................ | 370/401 |
| 7,035,940 B2 * | 4/2006 | Sahasrabudhe et al. | ...... | 709/242 |
| 7,072,338 B2 * | 7/2006 | Tsuchiya et al. | .............. | 370/392 |
| 7,158,526 B2 * | 1/2007 | Higuchi et al. | ............... | 370/401 |
| 7,188,191 B1 * | 3/2007 | Hovell et al. | ................. | 709/245 |
| 7,339,903 B2 * | 3/2008 | O'Neill | ......................... | 370/313 |
| 7,349,377 B2 * | 3/2008 | Le et al. | ........................ | 370/338 |
| 7,362,742 B1 * | 4/2008 | Siddiqi et al. | ................. | 370/350 |
| 7,436,804 B2 * | 10/2008 | O'Neill | ......................... | 370/401 |
| 7,483,697 B2 * | 1/2009 | Ohki | ........................... | 455/432.1 |
| 7,508,828 B2 * | 3/2009 | Ng et al. | ........................ | 370/392 |
| 7,539,773 B2 * | 5/2009 | Akisada et al. | ............... | 709/245 |
| 7,680,111 B2 * | 3/2010 | Lee et al. | ....................... | 370/401 |
| 7,860,037 B2 * | 12/2010 | Chen | ............................. | 370/310 |
| 2001/0015966 A1 * | 8/2001 | Casati | .......................... | 370/338 |
| 2002/0194259 A1 * | 12/2002 | Flykt et al. | ..................... | 709/202 |
| 2004/0006641 A1 * | 1/2004 | Abrol et al. | .................... | 709/245 |
| 2004/0095913 A1 * | 5/2004 | Westphal | ....................... | 370/338 |
| 2005/0175002 A1 * | 8/2005 | Le et al. | ........................ | 370/389 |

(Continued)

OTHER PUBLICATIONS

RFC 2782 Internet RFC/STD/FHY/BCK Archives, RFC 2782—A DNS RR for specifying the location of services (DSN SRF), Feb. 2000, 10 pages.

(Continued)

*Primary Examiner* — Ricky Ngo
*Assistant Examiner* — Dewanda Samuel
(74) *Attorney, Agent, or Firm* — Mintz, Levin, Cohn, Ferris, Glovsky and Popeo, P.C.

(57) ABSTRACT

A network entity located in a first network using a first protocol, the network entity supporting at least the first protocol of the first network and a second protocol of a second network. The network entity comprises a receiving unit for receiving data packets according to the first or second protocol, a mapping table for storing addresses according to the first and second protocols, an address determination unit for determining a destination address for a received packet from the mapping table, and a routing unit for routing the received packet in accordance with the determined destination address.

15 Claims, 9 Drawing Sheets

U.S. PATENT DOCUMENTS

2005/0185612 A1* 8/2005 He .................................. 370/329

OTHER PUBLICATIONS

RFC 3263 Internet RFC/STD/FHY/BCK Archives, RFC 3263—Session Initiation Protocol (SIP): Locating SIP Servers, Jun. 2002, 14 pages.

Tsirtsis et al., "Network Address Translation—Protocol Translation (NAT-PT)," IETF Standard, Internet Engineering Task Force, Feb. 2000, pp. 1-21.

Afifi et al., "Methods for IPv4-IPv6 Transition," Proceedings IEEE International Symposium on Computers and Communications, Jul. 6, 1999, pp. 478-484.

* cited by examiner

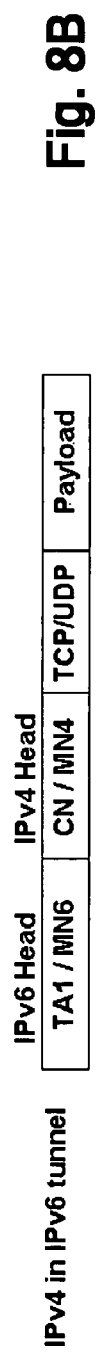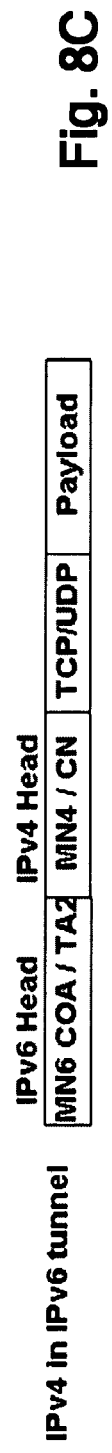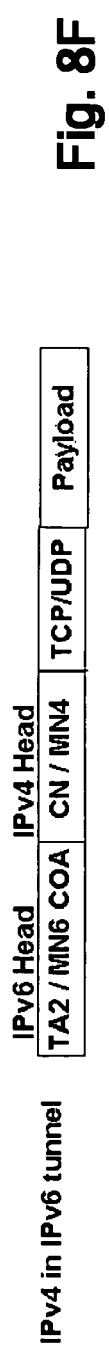

IPv6 Head | IPv4 Head
TA1 / MN6 COA | CN / MN4 | TCP/UDP | Payload

IPv4 in IPv6 tunnel

IPv6 Head | IPv4 Head
MN6 COA / TA2 | MN4 / CN | TCP/UDP | Payload

IPv4 in IPv6 tunnel

IPv4 Head
TA2 / CN4 | MN4 / CN | TCP/UDP | Payload

IPv4 in IPv4 tunnel

IPv4 Head
CN / TA2 | CN / MN4 | TCP/UDP | Payload

IPv4 in IPv4 tunnel

IPv6 Head | IPv4 Head
TA2 / MN6 COA | CN / MN4 | TCP/UDP | Payload

IPv4 in IPv6 tunnel

PROVIDING CONNECTION BETWEEN NETWORKS USING DIFFERENT PROTOCOLS

FIELD OF THE INVENTION

In general, the present invention relates to mobile communications using a network such as the Internet. In particular, the invention relates to supporting a connection according to a specific network protocol in an environment using another network protocol. According to an embodiment of the invention an IPv4 (Internet Protocol version 4) connection is supported in a Mobile IPv6 environment.

BACKGROUND OF THE INVENTION

Mobile IPv4 as a specific network layer protocol for mobile communications and Mobile IPv6 as another network layer protocol for mobile communications are the protocols solving the connectivity problem when IPv4 nodes roam in an IPv4 network or when IPv6 nodes roam in an IPv6 network. In other words, either mobile IPv4 or mobile IPv6 is used as routing support to permit IP nodes (hosts and routers) using IPv4 or IPv6 to seamlessly "roam" among IP subnetworks and media types. The Mobile IP method supports transparency above the IP layer, including the maintenance of active TCP connections and UDP port bindings.

During a transition period from IPv4 to IPv6, IPv4 and IPv6 networks are coexistent and a new upgraded IPv6 node may still want to communicate with an IPv4 node or access services inside an IPv4 network.

In case a node CN in a network using a specific protocol (e.g. an IPv4 node in a network using IPv4) wants to communicate with a node MN supporting the specific and another protocol and located in a network using the another protocol (e.g. an IPv4/IPv6 dual-stack mobile node in a network using Mobile IPv6), the node CN sends a packet to the node MN which passes through a router of a home network of the node MN supporting the specific and the another protocol. If the node MN is not in its home network, the router answers every packet received from CN and destined to MN with an error message, e.g. an ICMPv4 (Internet Control Message Protocol version 4) error message according to the specific protocol supported by the CN. In other words, the connection between the MN and the CN is broken because there is no IPv4 environment while the dual stack MN is roaming out of its dual stack home network into an IPv6 only network. Thus, known transition schemes can enable a communication between an IPv4 and an IPv6 node, but it is not possible to solve the roaming problem of a mobile node.

For example, when an IPv4 node tries to communicate with a mobile IPv6 terminal which also supports IPv4, a packet sent from the IPv4 node passes through a dual stack router of the home network of the mobile IPv6 terminal. In case the mobile IPv6 terminal is away from its home network, the router answers the packet with an ICMP (Internet Control Message Protocol) error 'host unreachable'. This means that the mobile IPv6 terminal is not reachable for the IPv4 node when the mobile node roams outside its home network.

Assuming a dual stack mobile node MN supporting the protocol of its home network such as IPv6 as well as a protocol of a correspondent node CN located in another network using e.g. IPv4, the mobile node MN is able to reach the correspondent node CN even if the mobile node MN is not located in its home network but roams in a visited network using IPv6. However, the correspondent node CN having a conventional IPv4 connection cannot reach the roaming mobile node MN. Rather, in an IPv4 connection to an IPv6 network, the error 'host unreachable' is generated in case a host does not attach to its original network.

SUMMARY OF THE INVENTION

It is therefore an object of the invention to solve the above problem and to provide a support for a connection according to a specific network protocol in a network using a different protocol.

According to an aspect of the invention, this object is achieved by a network entity located in a first network comprising a mobile network, the first network using a first protocol, the network entity supporting at least the first protocol of the first network and a second protocol of a second network, the network entity comprising:

a receiving unit for receiving data packets according to the first or second protocol;

a mapping table for storing addresses according to the first and second protocols;

an address determination unit for determining a destination address for a received packet from the mapping table; and a routing unit for routing the received packet in accordance with the determined destination address.

The above object is also achieved by a network node for communicating data packets, located in a first network using a first protocol, the network node supporting at least the first protocol of the first network and a second protocol of a second network, the network node comprising:

a registering unit for registering addresses of the network node according to the first protocol and/or according to the second protocol in a network entity of a plurality of network entities for routing data packets to and from the second network, the network entities being located in the first network and supporting the first and second protocols.

Furthermore, the above object is achieved by a network node for communicating data packets, located in a second network using a second protocol, the network node using the second protocol of the second network, the network node comprising:

a determination unit for determining a network entity of a plurality of network entities of a first network in accordance with a destination of a data packet to be sent to a node in the first network, the first network using a first protocol and the network entity supporting the first and second protocols and performing routing of data packets to and from the second network; and a sending unit for sending the data packet according to the second protocol to the network entity determined by the determination unit.

According to another aspect of the invention, the above object is achieved by a system comprising the network entity, the network node located in the first network and the network node located in the second network.

According to a further aspect of the invention, the above object is achieved by methods corresponding to the network entity, the network node located in the first network and the network node located in the second network, respectively.

The invention can also be carried out by means of a computer program product for computers or microprocessors constituting the network entity, the network node located in the first network and the network node located in the second network.

With the present invention, a node MN supporting a first and a second network protocol located in a first network using the first protocol can be reached by a node CN supporting only a second network protocol when the MN roams in a foreign or visited network using the first protocol. In other words, by using the network entity of the invention a packet sent from the CN can be forwarded to the foreign network.

The invention solves the connectivity problem between a dual-stack mobile node (MN) and a corresponding node (CN) during MN roaming. Specifically, an IPv4 CN can keep communication with a dual-stack MN when the MN is roaming in mobile IPv6 networks. The proposed mechanism keeps the connectivity and forwards/redirects the packet from the CN to the MN and vice versa. With the proposed mechanism a dual-stack mobile node supporting Mobile IPv6 can access IPv4 services in IPv4 only network.

BRIEF DESCRIPTION OF THE DRAWINGS

FIGS. 8A to 8F and 9A to 9E show structures of data packets transmitted in the network system according to the embodiment of the invention.

DESCRIPTION OF THE INVENTION

The idea of the invention is to add a network entity which serves roaming network nodes such as mobile nodes supporting a first and a second protocol in a network using the first protocol. This concept of the invention is described in the following with reference to FIGS. 1 to 4.

Figure 1:
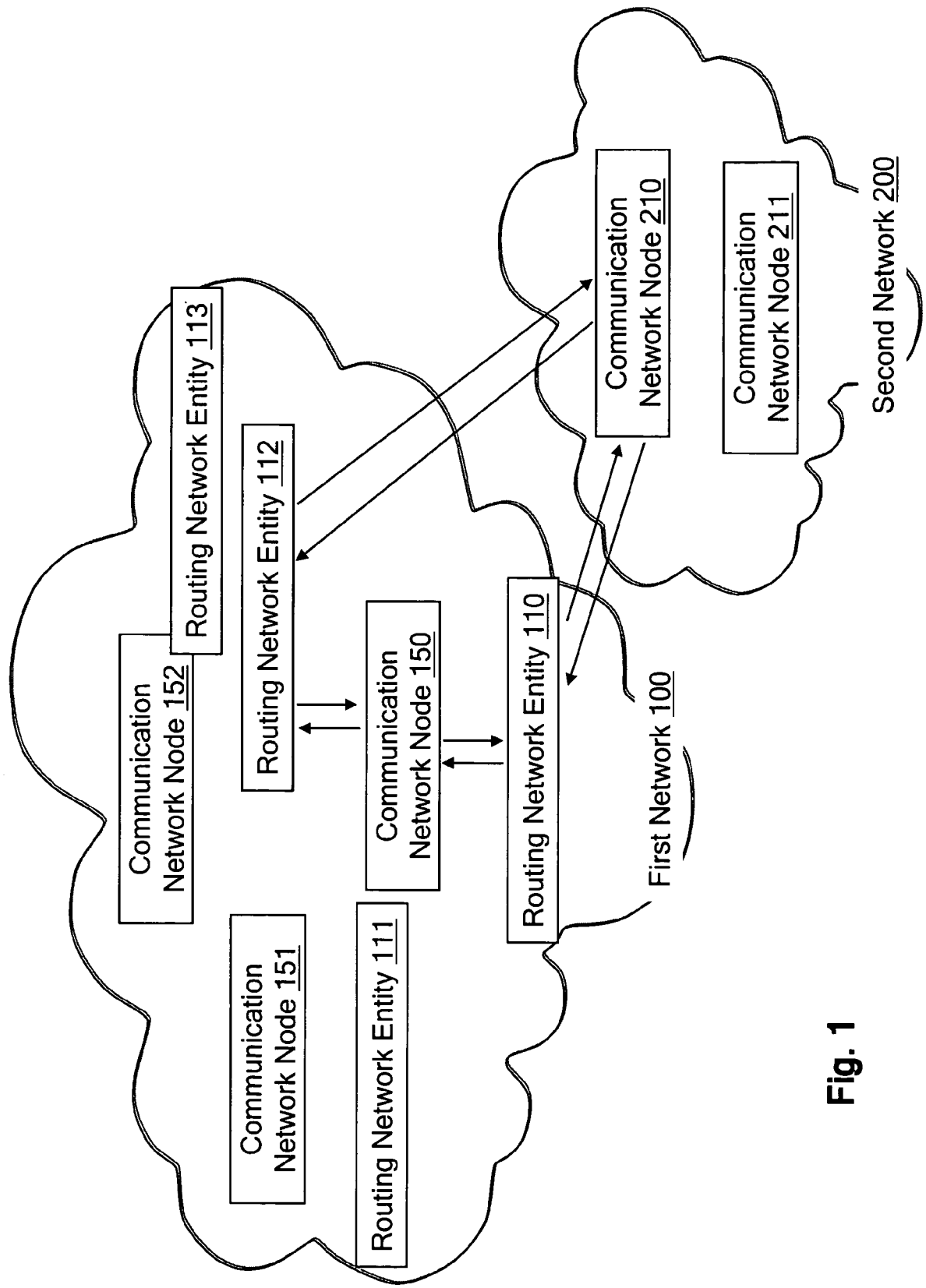
FIG. 1 shows a schematic block diagram illustrating a connection between a communication network node in a first network using a first protocol and a communication network node in a second network using a second protocol according to the invention.

FIG. 1 shows a network system comprising a first network 100 and a second network 200. The first network 100 uses a first network layer protocol such as IPv6 and may be subdivided into home and visited networks. The first network 100 comprises a plurality of communication network nodes 150, 151, 152 and a plurality of routing network entities 110, 111, 112, 113 each arranged to serve the communication network nodes 150, 151, 152. The second network 200 uses a second network layer protocol such as IPv4 different from the first network layer protocol and comprises a plurality of communication network nodes 210, 211. The second network 200 may also be subdivided in home networks and visited networks.

For example, the routing network entities 110 and 111 and the communication network node 151 are located in a home network of the communication network node 150, and the routing network entities 112 and 113 and the communication network node 152 are located in a visited or foreign network when the communication network node 150 roams from its home network to the foreign network while communicating with the communication network node 210 of the second network 200.

Each routing network entity 110-113 supports at least the first protocol of the first network 100 and the second protocol of the second network 200. Each communication network node 150-152 of the first network 100 supports at least the first protocol of the first network 100 and the second protocol of the second network 200. Each communication network node 210, 211 of the second network 200 supports only the second protocol.

Figure 2:
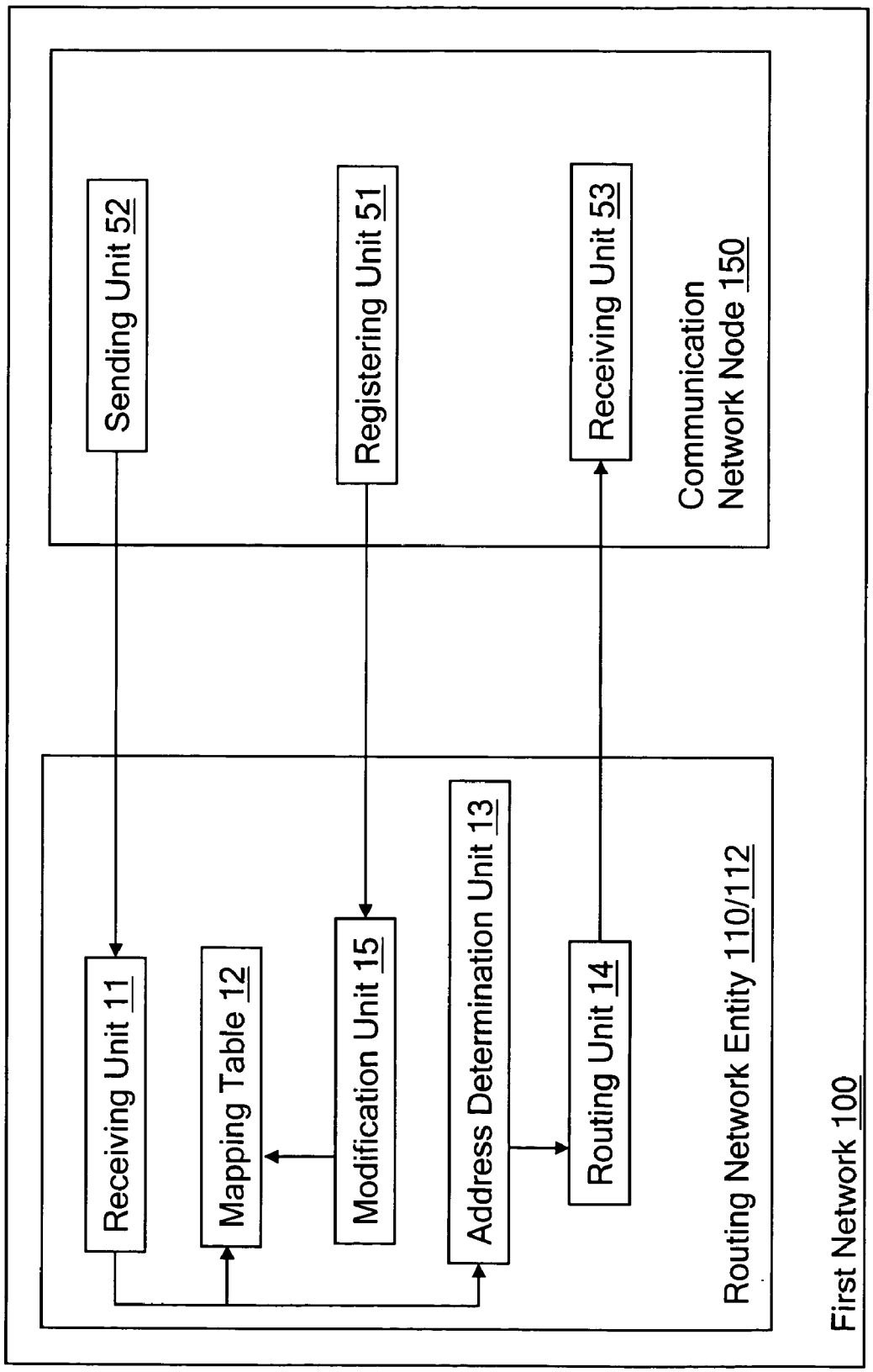
FIG. 2 shows a schematic block diagram illustrating a routing network entity and a communication network node in the first network in greater detail.
Figure 3:
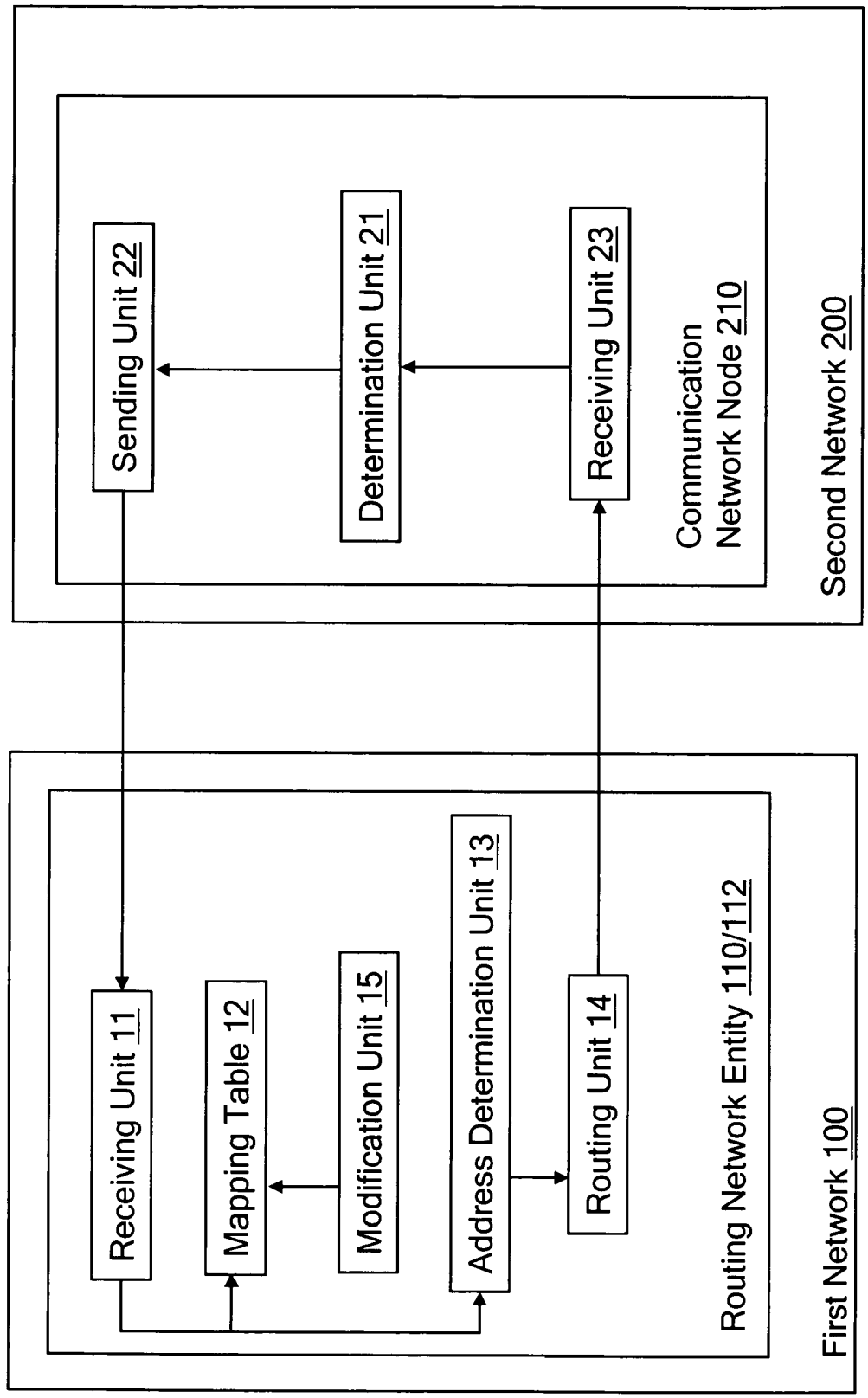
FIG. 3 shows a schematic block diagram illustrating the routing network entity in the first network and a communication network node in the second network in greater detail.

As shown in FIG. 2 or FIG. 3, each routing network entity 110-113 comprises a receiving unit 11 for receiving data packets according to the first or second protocol, a mapping table 12 for storing addresses according to the first and second protocols, an address determination unit 13 for determining a destination address for a received packet from the mapping table 12, and a routing unit 14 for routing the received packet in accordance with the determined destination address.

As shown in FIG. 2, each communication network node 150-152 located in the first network 100 comprises a registering unit 51 for registering addresses of the communication network node according to the first protocol and/or according to the second protocol in a routing network entity of a plurality of routing network entities 110-113 for routing data packets to and from the second network. For example, as shown in FIG. 1, the communication network node 150 registers in the routing network entity 110 of its home network and in the routing network entity 112 of the foreign network.

As shown in FIG. 3, each communication network node 210, 211 of the second network 200 comprises a determination unit 21 for determining a routing network entity of the plurality of routing network entities 110-113 of the first network 100 in accordance with a destination of a data packet to be sent to a communication network node in the first network. For example, as shown in FIG. 1, the determination unit 21 of the communication network node 210 determines the routing network entity 110 or 112 serving the communication network node 150. Each communication network node 210, 211 of the second network 200 further comprises a sending unit 22 for sending the data packet according to the second protocol to the routing network entity determined by the determination unit 21.

When the receiving unit 11 of the routing network entity 110 or 112 receives a data packet according to the second protocol from the communication network node 210, the address determination unit 13 determines a destination address according to the first protocol for the received data packet from the mapping table 12 on the basis of a destination address indicated in the received packet according to the second protocol, and the routing unit 14 routes the received data packet to the determined destination address within a packet according to the first protocol e.g. to the communication network node 150 as shown in FIG. 2. In other words, a packet according to the second protocol is tunneled in a packet of the first protocol.

Each routing network entity 110-113 may further comprise a modification unit 15 for modifying the mapping table 12 in accordance with the registering unit 51 of the communication network node 150 registering its addresses according to the first protocol and/or second protocol in the network entity as shown in FIG. 2.

Moreover, as shown in FIG. 2, when the receiving unit 11 receives a data packet according to the first protocol from the communication network node 150, the received data packet including a data packet of the second protocol indicating a destination address in the second network, the routing unit 14 routes the data packet of the second protocol to the indicated destination address in accordance with the second protocol e.g. to the communication network node 210 as shown in FIG. 3.

The routing unit 14 may decapsulate the second protocol data packet from the received tunneled data packet of the first protocol and encapsulate it into a packet of the second protocol, and route this packet to the destination address in the second network 200. In other words, a packet of the second protocol is tunneled in a packet of the second protocol.

As shown in FIG. 2, each communication network node 150-152 may further comprise a sending unit 52 for sending a data packet of the second protocol with a destination address in the second network 200 in a packet of the first protocol to the routing network entity 110 or 112. In other words, a packet of the second protocol is tunneled in a packet of the first protocol.

Furthermore, each communication network node 150-152 may further comprise a receiving unit 53 for receiving a data packet according to the first protocol from the routing network entity 110 or 112, the received data packet including a data packet according to the second protocol.

The registering unit 51 may determine the routing network entity 110 located in the home network of the communication network node 150 as the network entity for routing data packets.

The registering unit 51 may further determine the routing network entity 112 in the foreign network visited by the communication network node 150 as the network entity for routing data packets.

Furthermore, the registering unit 51 may register the addresses of the communication network node 150 according to the first protocol and/or according to the second protocol in the routing network entity 112 of the visited network and in the routing network entity 110 of the home network.

As shown in FIG. 3, the communication network node 210 may further comprise a receiving unit 23 for receiving a data packet from the communication network node 150 in the first network via one of the plurality of network entities 110-113 for routing data packets, e.g. via the routing network entities 110 or 112 as shown in FIG. 1, wherein the determination unit 21 may determine the one routing network entity 110 or 112 for a next data packet to be sent to the communication network node 150.

The sending unit 22 of the communication network node 210 may send the data packet of the second protocol with the communication network node 150 as the destination in a packet of the second protocol destined to the determined routing network entity 110 or 112. In other words, a packet of the second protocol is tunneled in a packet of the second protocol.

The receiving unit 23 of the communication network node 210 may receive the data packet from the communication network node 150 in a packet of the second protocol sent from the one routing network entity 110 or 112.

Figure 4:
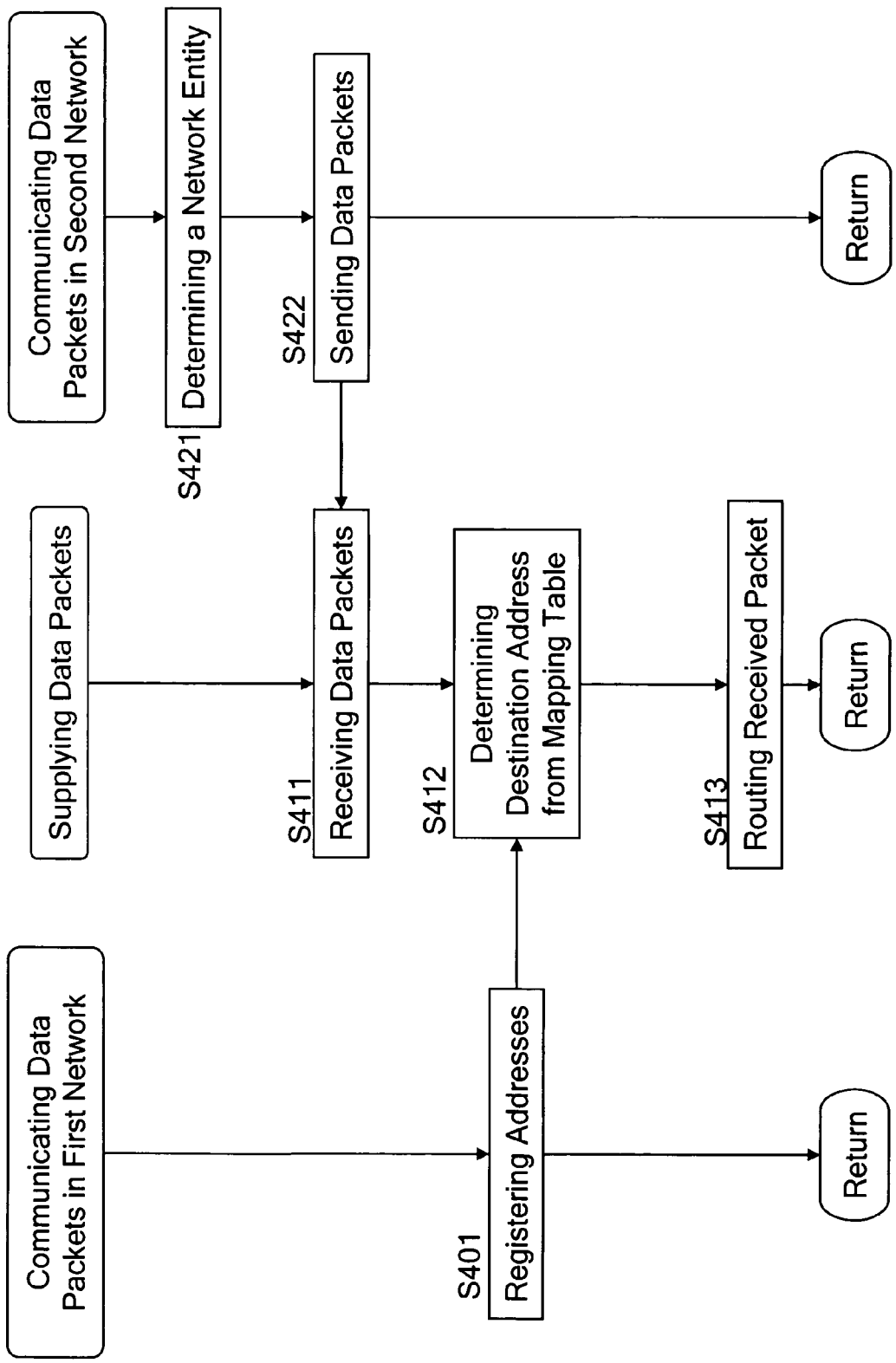
FIG. 4 shows flowcharts illustrating a method of supplying data packets, a method of communicating data packets in the first network and a method of communicating data packets in the second network according to the invention.

FIG. 4 shows flowcharts illustrating a method of communicating data packets in the first network 100, a method of supplying data packets between the first network 100 and the second network 200, and a method of communicating data packets in the second network 200.

In the method of communicating data packets in the first network 100, in step S401 addresses of a communication network node in the first network 100 according to the first protocol and/or according to the second protocol are registered in a routing network entity of the plurality of routing network entities 110-113 for routing data packets to and from the second network 200.

In the method of supplying data packets, in step S411 data packets according to the first or second protocol are received from communication network nodes of the first and/or second networks. In step S412 a destination address for a received packet is determined from a mapping table storing addresses according to the first and second protocols. In step S413 the received packet is routed in accordance with the determined destination address. As indicated in FIG. 4, the addresses registered in step S401 may be registered in the mapping table.

In the method of communicating data packets in the second network 200, in step S421 a routing network entity of a plurality of routing network entities 110-113 of the first network 100 is determined in accordance with a destination of a data packet to be sent to a communication network node in the first network 100. It is to be noted that communication network nodes in the second network may only need to know the network entities 110 or 112, whereas the network entities 111 and 113 are not visible to those communication nodes. In step S422 the data packet according to the second protocol is sent to the routing network entity determined in step S421. As shown in FIG. 4, the data packet is received in step S411 of the method of supplying data packets.

According to an embodiment of the invention, the first network 100 is an IPv6 network and the second network is an IPv4 network. The communication network node 150 is a dual-stack mobile node supporting IPv4 and IPv6. The communication network node 210 in the second network is referred to as Correspondent Node (CN). As the routing network entities Transition Agents (TAs) are added to take the responsibility of serving roaming dual-stack Mobile Nodes (MNs). The serving TA maintains a list (mapping table) comprising IPv4-IPv6 address pairs of each served MN, an MN Care of Address (CoA) and an indication whether the MN is at home. A tunnel may be established between an MN IPv6 CoA and the TA in IPv6, and all IPv4 packets may be redirected to the MN at a new CoA when the IPv4 CN sends these IPv4 packets to the MN.

When the MN is in a foreign network, IPv4-in-IPv4 tunnelling is used to enable the TA in the foreign network to forward packets to the CN, and subsequently the CN may send successive packets to the MN via the TA in the foreign network on a new IPv4 route to the foreign network.

As described above, the MN is a dual-stack terminal supporting MIPv6 (Mobile IPv6) and IPv4. The CN only supports IPv4. Moreover, the CN supports IPv4-in-IPv4 tunnelling. The IPv4 address of the MN remains the same when the MN is roaming. It is assumed that the living network is MIPv6, and the MN and TA are dual-stack nodes supporting IPv6 and IPv4, the TA being located in the MIPv6 network.

In particular, a network element TA is introduced in Mobile IPv6 networks to handle the roaming problem of a dual-stack MIPv6 node MN communicating with an IPv4 CN. The TA obtains an IPv6 CoA of the MN from the MN, forwards packets to the MN, and also acts as a Tunnel Server which can tunnel IPv4 packets over the IPv6 network.

The MN registers its IPv4 and IPv6 addresses in the TA and may send a Binding Update (BU) to the TA when it roams to a foreign network. The IPv4 CN may use a scheme similar to binding cache for mapping TAs to the mobile node's IPv4 addresses. In case fixed IPv4 addresses are used, after MN got its IPv4 address, the address is assigned to the TA serving this MN fixedly. Alternatively, in case private IPv4 addresses are used, a Domain Name Server (DNS) may be used to resolve the MN host name to its private IPv4 addresses. When the CN initiates a connection, it gets the private IPv4 address of the MN and the TA of the MN from the DNS.

The TA may be a separate element in the Mobile IPv6 network. In this case, the MN sends a BU to the TA enabling the TA to obtain a CoA of the MN and to update its mapping address list of IPv6 and IPv4 addresses.

Alternatively, the TA and a Home Agent (HA) may be integrated together, or the TA may be implemented inside the HA. In this case, the HA has both IPv6 and IPv4 connections, while the MN does not have to send a separate BU to the TA since the information is available at the HA.

In the following the embodiment of the invention is described in greater detail taking into account FIGS. 5 to 9. In the arrangements shown in FIGS. 5 to 7 the TA is implemented as a separate network element.

Figure 5:
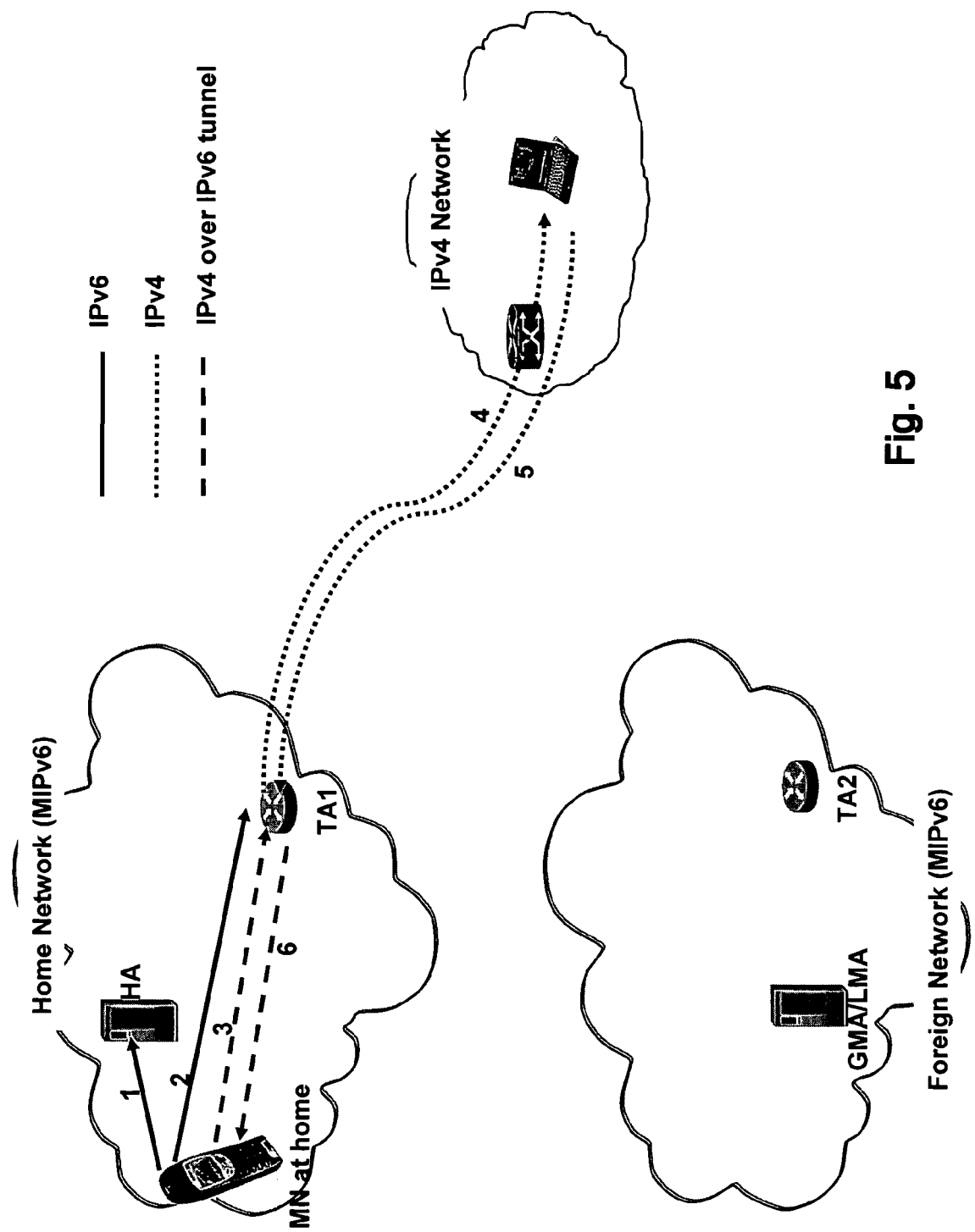
FIG. 5 shows a network system according to an embodiment of the invention, in which a communication network node MN located in a first network initiates a connection to a communication network node CN located in a second network when the first network is a home network of MN.

Referring to FIG. 5, a mobile node MN in its MIPv6 home network initiates an IPv4 connection. For this purpose, in communication 1 the MN accesses a home agent HA of the home network. Moreover, in communication 2 the MN registers its home addresses for IPv6 and IPv4 in a transition agent TA1 of the home network, whereupon the TA1 modifies its IPv6-IPv4 mapping table. Usually the MN acquires its IP addresses by a certain scheme and these IP addresses may be registered in a DNS or another database. After the MN got its (fixed) IPv4 address, then the address is registered in a TA server fixedly.

In communication 3 the MN sends IPv4-in-IPv6 tunnel packets to the TA1. This IPv4-in-IPv6 tunnel packets are IPv4 packets with an additional IPv6 header. FIG. 8A shows the structure of such IPv4-in-IPv6 tunnel packets including an IPv6 header with the IPv6 home address MN6 HOA of the MN as source and the address TA1 of the TA1 as destination, followed by an IPv4 packet having an IPv4 header with the IPv4 address MN4 of the MN as source and the address CN of a corresponding node CN in the IPv4 network as destination. The IPv4 packet further comprises a TCP/UDP data field as well as a payload data field.

In communication 4, after having taken out the IPv4 packets from the IPv4-in-IPv6 tunnel packets, the TA1 forwards the IPv4 packets with the source address MN4 and the destination address CN to the CN. In communication 5, the CN sends back IPv4 packets with the source address CN and the destination address MN4 to the TA1. In communication 6, the TA1 forms IPv4-in-IPv6 tunnel packets out of the received IPv4 packets and forwards the IPv4-in-IPv6 tunnel packets to the MN.

FIG. 8B shows the structure of the IPv4-in-IPv6 tunnel packets forwarded to the MN by the TA1. The tunnel packets include an IPv6 header with the address of the TA1 as source and the IPv6 address MN6 of the MN as destination, and an IPv4 packet having an IPv4 header with the address of the CN as source and the IPv4 address MN4 of the MN as destination, a TCP/UDP data field and a payload data field. The TA1 creates the tunnel packets according to the information in the mapping table, i.e. the IPv6 address MN6 of the MN is looked up from the mapping table on the basis of the destination address MN4 indicated in the header of the received data packets from the CN.

Figure 6:
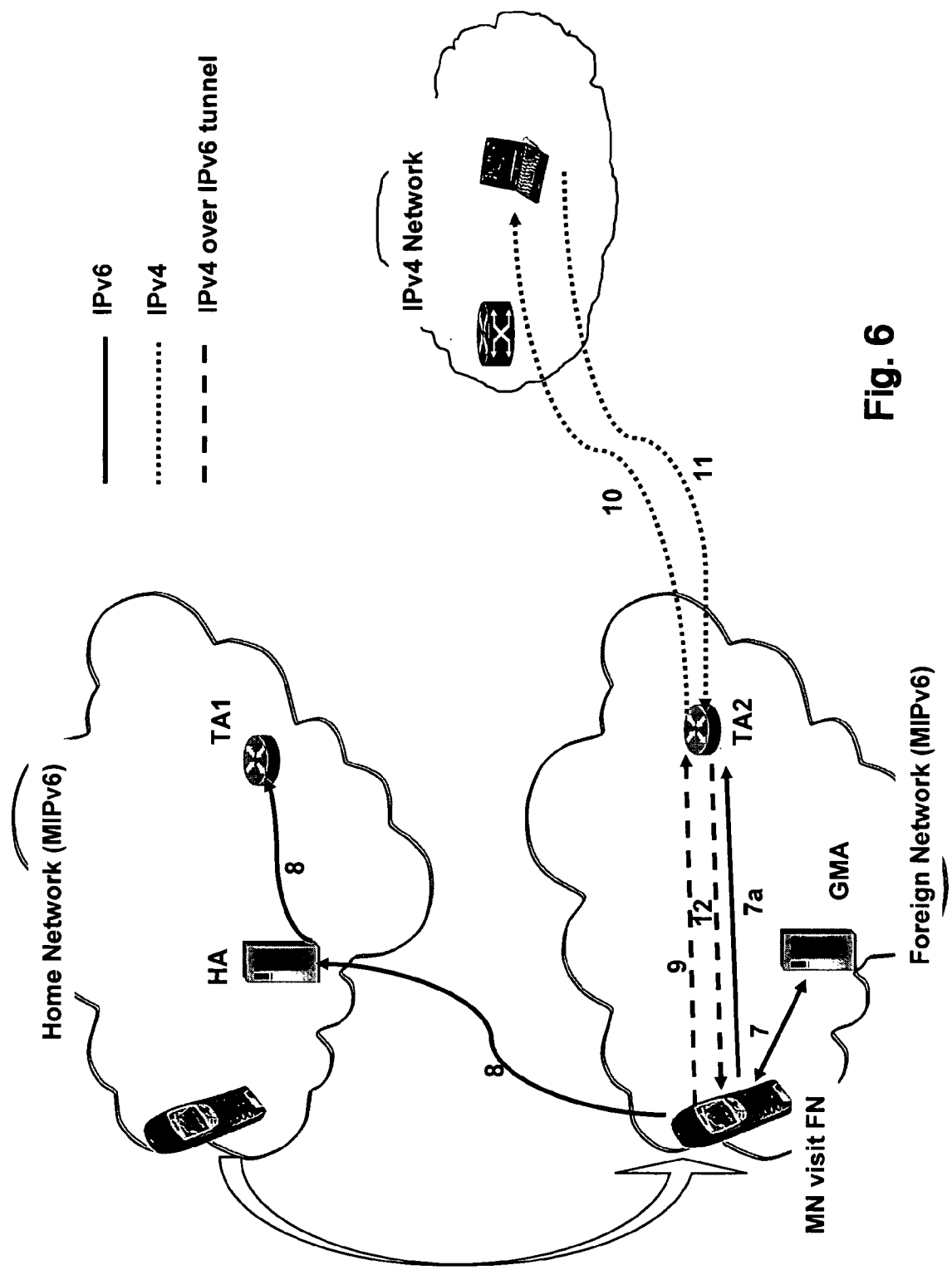
FIG. 6 shows the network system according to the embodiment of the invention, in which the communication network node MN in the first network initiates a connection to the communication network node CN in the second network when the first network is a visited network.

As shown in FIG. 6, when the MN roams to a foreign IPv6 network, the following steps prevent the connection between the MN and the CN from being broken.

In communication 7, the MN gets a Care of Address CoA from a Gateway Mobility Agent GMA or a Local Mobility Agent LMA in the foreign network, and registers the obtained CoA in a local TA, i.e. TA2 (communication 7*a*). The MN may find the TA2 in a directory server via a service discovery or similar approaches.

In order to find a TA in a visited network, a new service type may be defined for the TA to utilize the mechanism of DNS. This definition is described in the following.

At first a type of service 'TA' for a transition agent is defined, which may have to be registered in IANA. If a service provider enables his network to support 'TA' service with a transition agent server, a record of a service 'TA' is added into the DNS database of the service provider. This record may contain information on name, IP address, port, etc. for the transition agent. In case a node wants to utilize 'TA' service to connect with others, it visits the DNS server firstly to seek information on a 'TA' service. The DNS server returns the information on the 'TA' service to the explorer node. Then the node possesses the necessary information on the 'TA' service so that the node is able to find the TA in the visited network.

After the MN has registered its CoA in the TA2, the TA2 is enabled to serve as a tunnel server supporting the MN to establish an IPv4-in-IPv6 tunnel between the MN and the TA2. Moreover, the TA2 is enabled to establish an IPv4-in-IPv4 tunnel between the TA2 and the CN.

In communication 8, the MN sends a binding update to the HA in the home network. The MN sends the same binding update to the TA1 in the home network, whereupon the TA1 updates its mapping table. Alternatively, the HA may forward the binding update received from the MN to the TA1.

In communication 9, the MN sends IPv4-in-IPv6 tunnel packets to the TA2. FIG. 8C shows such tunnel packets comprising an IPv6 header with the IPv6 address of the MN in the visited network MN6 CoA as source and the address of the TA2 as destination, and an IPv4 packet having an IPv4 header with the IPv4 address MN4 of the MN as source and the address of the CN as destination, a TCP/UDP data field and a payload data field.

In communication 10, the TA2 establishes an IPv4-in-IPv4 tunnel between the TA2 and the CN. Thereupon, the CN may change the route to the MN into this tunnel with a limited lifetime. In case the CN does not receive IPv4-in-IPv4 packets from the TA2 within this lifetime the route to the MN will be changed back to the original route (communication 4 in FIG. 5). This serves to have the CN communicating with the MN via TA1 when the MN is in its home network, and via TA2 when the MN is in the visited network. This is similar to a binding cache scheme, i.e. the CN can map MN's IPv4 address to a TA which is tunnelling MN's IPv6 packets.

In order to establish the IPv4-in-IPv4 tunnel, the TA2 takes out the IPv4 packets from the IPv4-in-IPv6 packets received from the MN, forms IPv4-in-IPv4 packets by adding another IPv4 header to the IPv4 packets and forwards the IPv4-in-IPv4 tunnel packets to the CN. FIG. 8D shows the IPv4-in-IPv4 tunnel packets comprising an IPv4 header with the address of the TA2 as source and the (IPv4) address of the CN as destination, and an (actual) IPv4 packet having an IPv4 header with the IPv4 address MN4 of the MN as source and the address of the CN as destination, a TCP/UDP data field and a payload data field.

In communication 11, the CN sends IPv4 packets to the TA2 via the tunnel in the inverse direction. FIG. 8E shows the IPv4-in-IPv4 tunnel packets sent from the CN to the TA2. The packets comprise an IPv4 header with the address of the CN as source and the address of the TA2 as destination, and an (actual) IPv4 packet having an IPv4 header with the address of the CN as source and the IPv4 address MN4 of the MN as destination, a TCP/UDP data field and a payload data field.

In communication 12, the TA2 replaces the IPv4 header of the packets received from the CN by an IPv6 header and forwards thus obtained IPv4-in-IPv6 tunnel packets to the MN. FIG. 8F shows the IPv4-in-IPv6 tunnel packets comprising an IPv6 header with the address of the TA2 as source and the IPv6 address MN6 CoA of the MN in the visited network as destination. The TA2 may look up the IPv6 address of the MN in the visited network by referring to a mapping table mapping the IPv4 address of the MN indicated in the packets received from the CN to the IPv6 address of the MN.

Figure 7:
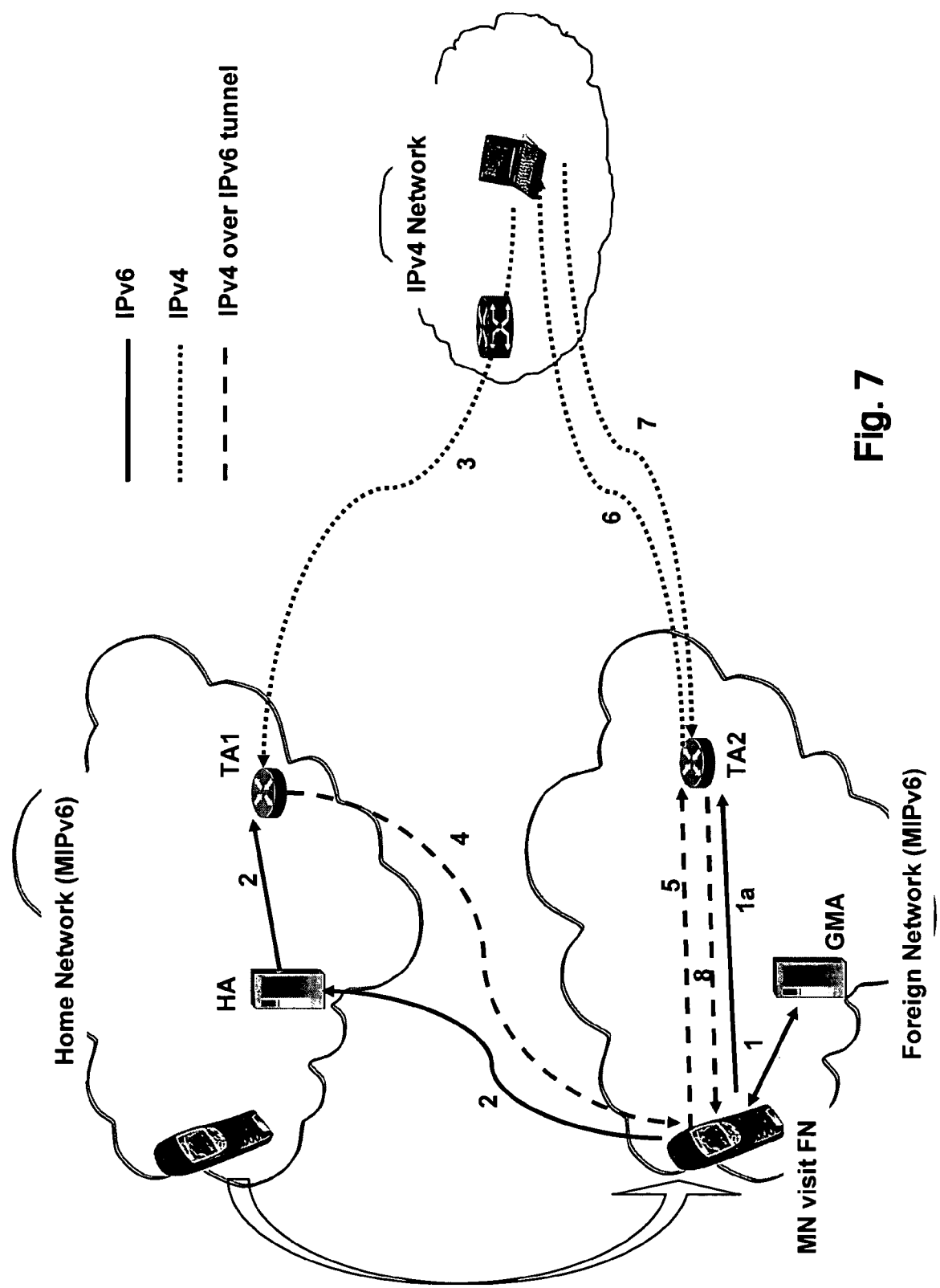
FIG. 7 shows the network system according to the embodiment of the invention, in which the communication network node CN initiates a connection to the communication network node MN when the node MN is in the visited network.

FIG. 7 shows a situation in which a CN in an IPv4 network initiates an IPv4 connection towards an MN in an IPv6 network when the MN is not in its home network.

When the MN roams to the visited network, the MN gets a Care of Address CoA from a GMA or LMA (communication 1), and registers the obtained CoA in the local TA, i.e. the TA2, in communication 1a. The MN may find the TA2 in a directory server via a service discovery scheme or similar approaches.

In communication 2, the MN sends a binding update to its HA in the home network. The MN may send the same binding update to its TA1 in the home network, whereupon the TA1 updates its mapping table. Alternatively, the HA may forward the binding update to the TA1.

In communication 3, the CN initiating an IPv4 connection to the MN in the IPv6 network sends IPv4 packets to the TA1. The IPv4 CN may use a scheme similar to binding cache for mapping TAs to the mobile node's IPv4 addresses. In case fixed IPv4 addresses are used, after MN got its IPv4 address, the address is registered in the TA serving this MN fixedly. Alternatively, in case private IPv4 addresses are used, a Domain Name Server (DNS) may be used to resolve the MN host name to its private IPv4 addresses. When the CN initiates a connection, it gets the private IPv4 address of the MN and the TA of the MN from the DNS.

Figure 9A:
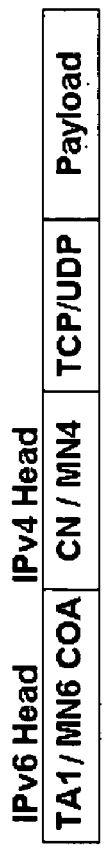

Upon receiving the packets from the CN, the TA1 forms IPv4-in-IPv6 tunnel packets by adding an IPv6 header to the received IPv4 packets. After that, the TA1 sends the IPv4-in-IPv6 tunnel packets to the MN with the address MN6 CoA in communication 4. FIG. 9A shows the tunnel packets sent to the MN, comprising an IPv6 header with the address of the TA1 as source and the IPv6 address MN6 CoA of the MN in the visited network as destination, and an IPv4 packet having an IPv4 header with the address of the CN as source and the IPv4 address of the MN as destination, a TCP/UDP data field and a payload data field.

Figure 9B:

In communication 5, the MN responds to the IPv4-in-IPv6 tunnel packets sent from the TA1 by forming IPv4-in-IPv6 tunnel packets for the CN and sending these packets to the TA2 serving the MN in the visited network. FIG. 9B shows the tunnel packets sent from the MN to the TA2. The tunnel packets comprise an IPv6 header with the IPv6 address MN6 CoA of the MN in the visited network as source and the address of the TA2 as destination, and an IPv4 packet having an IPv4 header with the IPv4 address MN4 of the MN as source and the address of the CN as destination, a TCP/UDP data field and a payload data field.

Figure 9C:

Upon receiving the packets from the MN, the TA2 forms IPv4-in-IPv4 tunnel packets by replacing the IPv6 header of the received packets by an IPv4 header. The TA2 establishes an IPv4-in-IPv4 tunnel with the CN, whereupon the CN changes the route to the MN into the tunnel with a time for expire. In communication 6, the TA2 forwards the IPv4-in-IPv4 tunnel packets to the CN via the tunnel similar to FIG. 6. FIG. 9C shows the IPv4-in-IPv4 tunnel packets comprising an IPv4 header with the address of the TA2 as source and the (IPv4) address of the CN as destination, and an (actual) IPv4 packet having an IPv4 header with the IPv4 address MN4 of the MN as source and the address of the CN as destination.

Figure 9D:

In communication 7, the CN sends back packets to the TA2 via the tunnel in the inverse direction. FIG. 9D shows the IPv4-in-IPv4 tunnel packets sent from the CN to the TA2, comprising an IPv4 header with the address of the CN as source and the address of the TA2 as destination and an (actual) IPv4 packet having an IPv4 header with the address of the CN as source and the IPv4 address MN4 of the MN as destination.

Figure 9E:
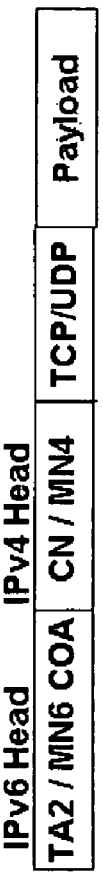

Upon receiving the packets from the CN, the TA2 forms IPv4-in-IPv6 packets out of the received packets by replacing the first IPv4 header with an IPv6 header. In communication 7, the TA2 forwards the IPv4-in-IPv6 tunnel packets to the MN. FIG. 9E shows the IPv4-in-IPv6 tunnel packets comprising an IPv6 header with the address of the TA2 as source and the IPv6 address MN6 CoA of the MN in the visited network as destination and an IPv4 packet having an IPv4 header with the address of the CN as source and the IPv4 address MN4 of the MN as destination. The TA2 may obtain the IPv6 address of the MN in the visited network by referring to a mapping table mapping the IPv4 address of the MN indicated in the packets received from the CN to the MN's IPv6 address.

The function of the TA may be implemented in GGSNs (Gateway GPRS (General Packet Radio Service) Support Nodes) to support connection between a plurality of networks.

In the above embodiment it is supposed that the MN has a global IPv4 address and keeps the same address during its roaming. However, the invention can be further extended to support MNs using private IPv4 addresses. In case an IPv4-in-IPv4 tunnel is also established between the TA of the MN home network and the CN, tunnelled packets do not take care of the IP address of the MN. When the MN is in the home network, packets transmitted between the CN and the TA will be transmitted via this tunnel so that the MN's private IPv4 address is invisible to others. In other words, since private IPv4 addresses are not routable in a global IPv4 Internet, in this case, an IPv4-in-IPv4 tunnel is needed to be established between the TA of the MN home network and the CN. The private IPv4 address is encapsulated in the tunnelled packet, and packets transmitted between the CN and the TA will be transmitted via this tunnel. A DNS is used to resolve the MN host name to the IPv4 private address. When the CN initiates a connection, it will firstly get the IPv4 private address of the MN and its TA from the DNS. Then the CN sends tunnelled packets to the TA.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
   a processor configured to
      determine, based on a mapping table, a destination address of a mobile node for a data packet received from a receiver according to a first protocol or a second protocol, wherein the mobile node is configured to communicate according to the first and the second protocols, initiate routing of the received data packet in accordance with the determined destination address via a transmitter, receive, from the receiver, communications from the mobile node to register addresses of the mobile node according to one or more of the first protocol and the second protocol, and modify the mapping table in accordance with the received communications, wherein the processor is configured to enable the mobile node to communicate with a correspondent node in a network using the first protocol when the mobile node is in a roamed network using the second protocol, wherein the apparatus comprises a network entity located in a home network, the apparatus using the first protocol and supporting the first and second protocols, receive, from the receiver, a data packet according to the first protocol from a node located in the first network, wherein the received data packet includes a data packet of the second protocol indicating a destination address in a second network, and initiate routing of the data packet of the second protocol to the indicated destination address in accordance with the second protocol via the transmitter.

2. The apparatus according to claim 1, wherein the first protocol comprises internet protocol version 4 and the second protocol comprises internet protocol version 6, wherein the processor is further configured to receive, from the receiver, a data packet according to the second protocol from a node located in a second network, determine a destination address according to the first protocol for the received data packet using the mapping table and based on a destination address indicated in the received data packet according to the second protocol, and initiate routing of the received data packet to the determined destination address, within a packet according to the first protocol via the transmitter.

3. The apparatus according to claim 1, wherein the transmitter is further configured to decapsulate the data packet of the second protocol included in the received data packet of the first protocol, to encapsulate the data packet of the second protocol into a packet of the second protocol and to route the packet to the destination address.

4. An apparatus, comprising:

a processor configured to initiate communication, via a transmitter, with a network entity when the processor initiates a connection according to a second protocol in order to register addresses of the apparatus according to one or more of a first protocol and the second protocol in the network entity, wherein the network entity is configured to route data packets to and from a second network using the second protocol, the network entity is located in a first network comprising a home network, using the first protocol and supporting the first and the second protocols, the apparatus is configured to communicate according to the first and the second protocols, the network entity is in the home network of the apparatus and the network entity is configured to enable the apparatus to communicate with a correspondent node in a network using the first protocol when the apparatus is in a roamed network using the second protocol, the network entity is configured to send a data packet to the apparatus according to the first protocol, wherein the sent data packet includes a data packet of the second protocol indicating a destination address of the apparatus in the roamed network, and the correspondent node is configured to initiate routing of the data packet from the network entity in accordance with the second protocol.

5. The apparatus according to claim 4, wherein the processor is further configured to send a data packet of the data packets of the second protocol with a destination address in the second network in a packet of the first protocol to the network entity.

6. The apparatus according to claim 4, wherein the processor is further configured to determine the network entity located in a the home network of the apparatus as the network entity configured to route the data packets.

7. The apparatus according to claim 6, wherein the processor is configured to further determine a network entity in a network visited by the apparatus as the network entity configured to route data packets.

8. The apparatus according to claim 7, wherein the processor is further configured to register the addresses of the apparatus according to one or more of the first protocol and the second protocol in the network entity of the visited network and in the network entity of the home network.

9. A system, comprising:

a network entity comprising a processor configured to determine, based on a mapping table, a destination address of a mobile node for a data packet received from a receiver according to a first protocol or a second protocol, wherein the mobile node is configured to communicate according to the first and the second protocols, initiate routing of the received data packet in accordance with the determined destination address via a transmitter, receive, from a receiver, communications from the mobile node to register addresses of the mobile node according to one or more of the first protocol and the second protocol, and modify the mapping table in accordance with the received communications, wherein the network entity is in a home network of the mobile node and the processor of the network entity is configured to enable the mobile node to communicate with a correspondent node in another network using the first protocol when the mobile node is in a roamed network using the second protocol; and a mobile node comprising a processor configured to initiate communication, via a transmitter, with the network entity when the processor initiates a connection according to the second protocol in order to register addresses of the mobile node according to one or more of the first protocol and the second protocol in order to register addresses of the mobile node according to one or more of the first protocol and the second protocol in the network entity, wherein the network entity is configured to route the-data packets to and from the other network using the second protocol, the network entity is located in the home network, using the first protocol and supporting the first and second protocols, and the mobile node is configured to communicate according to the first and the second protocols.

10. A method, comprising:

determining by a network entity, based on a mapping table, a destination address of a mobile node for a data packet received from a receiver according to a first protocol or a second protocol, wherein the mobile node is configured to communicate according to the first and the second protocols;

initiating routing, by the network entity, of the received data packet in accordance with the determined destination address;

receiving, by the network entity, communications from the mobile node to register addresses of the mobile node according to one or more of the first protocol and the second protocol;

modifying the mapping table, by the network entity, in accordance with the received communications, wherein the network entity is in a home network of the mobile node and the network entity is configured to enable the mobile node to communicate with a correspondent node in a network using the first protocol when the mobile node is in a roamed network using the second protocol, wherein the network element supports the first and second protocols, receiving from the receiver a data packet according to the first protocol from a node located in a first network, wherein the received data packet includes a data packet of the second protocol indicating a destination address in a second network, and initiating routing of the data packet of the second protocol to the indicated destination address in accordance with the second protocol.

11. A method, comprising:

communicating, by a mobile node, with a network entity when the mobile node initiates a connection according to a second protocol in order to register addresses of the mobile node according to one or more of a first protocol and the second protocol in the network entity, wherein the network entity is configured to route data packets to and from a second network using the second protocol, the network entity is located in a first network, using the first protocol and supporting the first and the second protocols, the mobile node is configured to communicate according to the first and the second protocols, and the network entity is in a home network of the mobile node and the network entity is configured to enable the mobile node to communicate with a correspondent node in a network using the first protocol when the mobile node is in a roamed network using the second protocol, the network entity being configured to send a data packet to the mobile node according to the first protocol, wherein the sent data packet includes a data packet of the second protocol indicating a destination address of the mobile node in the roamed network, and the correspondent node is configured to initiate routing of the data packet from the network entity in accordance with the second protocol.

12. A computer program product embodied on a non-transitory computer readable storage medium that includes computer readable instructions, that, when executed by a processor, cause the processor to perform a process, the process comprising:

determining by a network entity, based on a mapping table, a destination address of a mobile node for a data packet received from a receiver according to a first protocol or a second protocol, wherein the mobile node is configured to communicate according to the first and the second protocols;

initiating, by the network entity, routing of the received data packet in accordance with the determined destination address;

receiving, by the network entity, communications from the mobile node to register the addresses of the mobile node according to one or more of the first protocol and the second protocol, and modifying, by the network entity, the mapping table in accordance with the received communications, wherein the network entity is in a home network of the mobile node and the network entity is configured to enable the mobile node to communicate with a correspondent node in a network using the first protocol when the mobile node is in a roamed network using the second protocol, wherein network entity supports the first and second protocols, receiving, from the receiver, a data packet according to the first protocol from a node located in a first network, wherein the received data packet includes a data packet of the second protocol indicating a destination address in a second network, and initiating routing of the data packet of the second protocol to the indicated destination address in accordance with the second protocol via a transmitter.

13. The computer program product according to claim 12, wherein the computer readable instructions are directly loadable into an internal memory of the computer.

14. A computer program product embodied on a non-transitory computer readable storage medium that includes computer readable instructions, that, when executed by a processor, cause the processor to perform a process, the process comprising:

communicating with a network entity of a plurality of network entities when a mobile node initiates a connection according to a second protocol in order to register addresses of the mobile node according to one or more of a first protocol and the second protocol in the network entity, wherein the network entity is configured to route data packets of the first network to and from the second network using the second protocol, the network entities are located in the first network, using the first protocol and supporting the first and the second protocols, the mobile node is configured to communicate according to the first and the second protocols, and the network entity is in a home network of the mobile node and the network entity is configured to enable the mobile node to communicate with a correspondent node in a network using the first protocol when the mobile node is in a roamed network using the second protocol, receiving a data packet according to the first protocol from a node located in a first network, wherein the received data packet includes a data packet of the second protocol indicating a destination address in a second network, and initiating routing of the data packet of the second protocol to the indicated destination address in accordance with the second protocol.

15. A method comprising:

determining, based on a mapping table, a destination address of a mobile node for a data packet received according to a first protocol or a second protocol, wherein the mobile node is configured to communicate according to the first and the second protocols, and initiate routing of the received data packet in accordance with the determined destination address, receiving communications from the mobile node to register addresses of the mobile node according to one or more of the first protocol and the second protocol, and modifying the mapping table in accordance with the received communications, wherein the network entity is in a home network of the mobile node and of the network entity is configured to enable the mobile node to communicate with a correspondent node in another network using the first protocol when the mobile node is in a roamed network using the second protocol;

initiating communication when a connection is initiated according to the second protocol in order to register addresses of the mobile node according to one or more of the first protocol and the second protocol in order to register addresses of the mobile node according to one or more of the first protocol and the second protocol in the network entity, wherein the network entity is configured to route the-data packets to and from the other network using the second protocol, wherein the network entity is located in the home network, wherein the network entity uses the first protocol and supports the first and second protocols, and wherein the mobile node is configured to communicate according to the first and the second protocols.

* * * * *